Feb. 22, 1966 G. NATTA ETAL 3,236,917
ELASTOMER OF AN ETHYLENE COPOLYMER CROSS-LINKED WITH AN
UNSATURATED ACID OR ANHYDRIDE
Filed Dec. 31, 1957 3 Sheets-Sheet 1

INVENTOR
GUILIO NATTA
GIOVANNI CRESPI
GIANCARLO BORSINI
BY Toulmin & Toulmin
ATTORNEY

Fig. 3

INVENTOR
GUILIO NATTA
GIOVANNI CRESPI
GIANCARLO BORSINI

United States Patent Office 3,236,917
Patented Feb. 22, 1966

3,236,917
ELASTOMER OF AN ETHYLENE COPOLYMER CROSS-LINKED WITH AN UNSATURATED ACID OR ANHYDRIDE
Giulio Natta, Giovanni Crespi, and Giancarlo Borsini, Milan, Italy, assignors to Montecatini Società Generale per l'Industria Mineraria e Chimica, Milan, Italy
Filed Dec. 31, 1957, Ser. No. 706,382
Claims priority, application Italy, Jan. 9, 1957, 430/57; July 23, 1957, 10,997/57
22 Claims. (Cl. 260—878)

This invention relates to elastomers. More particularly, the invention relates to elastomers obtained from linear, substantially amorphous polyolefins, especially from such copolymers of alpha-olefins with ethylene, and to a process for making the elastomers.

G. Natta and his co-workers have disclosed that by polymerizing alpha-olefins of the formula $CH_2=CHR$ in which R is an alkyl group, and mixtures of the alpha-olefins with each other and with ethylene, under a low pressure and with the aid of certain catalysts containing organometallic bonds, saturated polymers and copolymers can be obtained which are linear, substantially amorphous, and contain a large number (more than 10%) of tertiary carbon atoms in the polymeric chains.

Our group has also disclosed that vulcanized rubbers can be obtained from the linear, substantially amorphous polymers and copolymers after chlorosulfonation thereof, by vulcanizing the chlorosulfonated polymers and copolymers in the presence of basic substances such as, for example, metal oxides and diamines. The chlorosulfonation results in the introduction into the polymeric chains of functional groups which are capable of forming cross-links in the subsequent vulcanization with the basic substances.

In that process of producing the elastomers, the polymers having the characteristics of amorphous, viscous materials are transformed into vulcanized elastomers essentially in two successive operations; chlorosulfonation and vulcanization.

It is not always easy to carry out the chlorosulfonation of the polymers in such a way that final products having good technological characteristics are obtained at a reasonable cost. In general, the chlorosulfonation has to be carried out on polymers dissolved in a halogenated solvent, using relatively low concentrations (of some units percent) of the polymer. In practice, this presents various problems, particularly those of obtaining a chlorosulfonated polymer free of solvent, and of recovering the considerable amounts of solvent used.

Moreover, if the chlorosulfonation conditions, particularly the temperature, are not controlled carefully, a marked degradation of the polymer can occur, resulting in a lowering of the values for the mechanical and elastic properties of the final elastomer. On the other hand, the use of metal oxides, and particularly of lead oxide, for vulcanizing the chlorosulfonated polymer, causes an increase of the elastic hysteresis and, therefore, a depreciation of the properties of the elastomers.

Chlorosulfonation is a chemical transformation which requires the use of strong and corrosive chemical reactants such as chlorine, sulfur dioxide, sulfuryl chloride, and the use of special apparatus. It is not always convenient for the normal users of crude rubber to carry out the chlorosulfonating treatment and, therefore, it becomes necessary, at least in some cases, for the supplier of the saturated polymers to market them in the chlorosulfonated, vulcanizable condition.

It has also been disclosed by our group that elastomers can be produced from copolymers of low unsaturation and obtained by copolymerizing ethylene or the alpha-olefins with small amounts of dienes or acetylenic monomers under certain specified conditions. Those copolymers can be vulcanized with sulfur or with compounds which release sulfur, using mixes containing vulcanization accelerators of the rapid or ultra-rapid type. The mechanical and elastic properties of the elastomers obtained after the vulcanization are good, when the double bonds in each macromolecule of the starting copolymer are sufficiently regularly distributed, and all of the macromolecules contain approximately the same number of double bonds. The more irregular the distribution of the unsaturation, the less satisfactory are the properties of the elastomers. Therefore, the elastomers obtained from the copolymers sometimes have poor elastic properties, for instance values of the permanent set at break of 100% and higher.

It is an object of this invention to provide new elastomers derived from the linear saturated, substantially amorphous polymers of the alpha-olefins and copolymers thereof, which elastomers are superior in various respects to those disclosed heretofore.

Another object is to provide a new process for producing the elastomers from the linear, saturated, substantially amorphous alpha-oelfin homopolymers and copolymers.

We have now found that very desirable elastomers can be obtained by grafting organic compounds containing functional acid groups onto the polymeric chains of the saturated, linear, substantially amorphous polymers and copolymers of the alpha-olefins $CH_2=CHR$ where R is an alkyl radical of from 1 to 2 carbon atoms, and then directly vulcanizing the graft polymers thus obtained.

More specifically, we find that, in the case of the linear alpha-olefin homopolymers and copolymers of the type aforesaid, it is possible to form cross-links between the various polymeric chains, that is, to effect vulcanization through a radical type reaction. In particular, we find that by grafting onto the polymeric chains of the polymers containing monomeric units derived from the alpha-olefins, organic compounds which contain in the molecule thereof at least one double bond and at least one functional acid group and which are capable of reacting with said polymers in the presence of radical type initiators, it is possible to form cross-links between the various polymeric chains, that is, to effect vulcanization through a radical type reaction. Moreover, we have found that it is preferable for the compound to be grafted onto the polymeric chains to contain a double bond conjugated with the double bonds of one or more groups.

In order to obtain a large number of grafts, using relatively small amounts of the compound to be grafted on the polymeric chains, it is useful to use a compound, such as maleic acid or maleic anhydride, which has a moderate tendency to polymerize, to yield polymers of very high molecular weight, and which readily undergoes chain transfer reactions.

The unsaturated organic compounds containing in the molecule at least one double bond and at least one functional acid group which can be grafted onto the polymeric chains in accordance with the present invention include maleic, fumaric, acrylic, methacrylic, ethacrylic, vinylacrylic, itaconic, methyl itaconic, aconitic, methyl aconitic, crotonic, alpha-methylcrotonic, cinnamic, 2,4-dyhydroxy cinnamic acid, maleic anhydride, citraconic anhydride, etc.

Radical initiators which may be used in our process, to promote reaction of the organic unsaturated compound such as maleic acid or maleic anhydride with the polymeric chains, include peroxides, hydroperoxides, and azo compounds. Specific examples of the useful radical initiators are benzoyl peroxide, chlorobenzoyl peroxide, cumyl peroxide, lauryl peroxide, the peroxides of methyl ethyl ketone and cyclohexanone, tertiary butyl peroxide, tertiary butyl perbenzoate, cumene, tetralin, decalin, tertiary butyl hydroperoxides, azo-bis-isobutyronitrile, etc.

Compounds capable of forming salt bridges between the polymeric chains, together with the acidic functional groups, may be used as vulcanization aids. They include metallic oxides and hydroxides, glycols, diamines, etc. Among the metal oxides, zinc, calcium, cadmium, magnesium, lead and iron oxides and hydroxides are particularly suitable for use in our process.

Vulcanization of the homopolymers and copolymers containing monomeric units derived from the alpha-olefins may be carried out in a press or autoclave at temperatures above the temperature at which the various ingredients are mixed, for example at a temperature between 120° C. and 180° C., depending on the specific ingredients of the mix and particularly on the type of radical initiator used. Since the different initiators yield free radicals at different rates, the vulcanizing conditions, i.e., temperature and duration, are selected depending on the particular initiator included in the mass.

In the accompanying drawing—

As has been stated, the polymers and copolymers used as starting material in our process are essentially saturated products.

The use of maleic anhydride and other similar compounds for vulcanizing highly unsaturated polymers, i.e., polymers containing at least 50% copolymerized diene, has been mentioned in the art. This is disclosed, for instance, in the U.S. Patents to H. P. Brown, Nos. 2,662,874, 2,724,707 and others. Those patents disclose the vulcanization of highly unsaturated rubbers, using maleic anhydride in the presence of radical type initiators and zinc oxide. It is indicated in the patents that large amounts of benzoyl peroxide and maleic anhydride are generally used.

The patentee explains his vulcanization process on the assumption that maleic anhydride binds itself to the double bonds present in the polymeric chain, thus forming rings of four carbon atoms, attached to a (CO)$_2$O group of acidic nature which is capable of forming salts with zinc oxide, thus forming cross-links and vulcanizing the product. In fact, in the patents, the necessity of using zinc oxide to obtain vulcanized products is clearly mentioned.

The disclosures of these prior art patents relating exclusively to unsaturated polymers have no bearing on our discovery that saturated organic polymers of the type described herein can be vulcanized by means of reactants of the type of maleic acid or maleic anhydride, i.e., that organic compounds of said type which contain double bonds can be grafted onto saturated polymeric chains and that, for such grafting, the saturated polymeric chains preferably contain tertiary carbon atoms, particularly of the type in which the hydrogen atom attached to the tertiary carbon atom is very mobile. In our case, it is not necessary for the polymeric chain to contain double bonds. While the presence of small amounts of double bonds in the chain is not harmful, such bonds are not necessary. Our method is versatile since it permits us to vulcanize not only the saturated polymers but also unsaturated polymers containing a very low number of double bonds, which cannot be easily vulcanized by the common methods based on the use of sulfur. By the present method it is possible, therefore, to vulcanize also the copolymers substantially containing alpha-olefins and only a low number of double bonds disclosed by our group to thus produce elastomers of good mechanical and elastic properties.

The present vulcanization process cannot be explained in terms of any of the mechanisms which have been postulated for the typical processes of maleic anhydride addition, such as the Diels-Alder addition to conjugated double bonds, the addition to unsaturated polymers with resulting formation of cyclic groups advanced in the Brown patents supra, the copolymerization with substances containing double bonds to produce polyester resins, or the substitutive addition to methylenic groups in α-position with respect to the double bond. Our process can only be explained in terms of mechanisms completely different from those just mentioned.

Since the vulcanization occurs on products which do not contain double bonds, but do contain tertiary carbon atoms, when maleic anhydride is used as the double bond-containing compound to be grafted onto the saturated polymeric chains the process can be explained as taking place through the following reactions:

(a) Formation of a radical on the polymer chain (1)

where R° is a radical derived from the initiator (b) The radical formed according to (1) can react with a mol of maleic anhydride according to the scheme—

(2)

with the formation of a new free radical.

This new radical could react with further molecules of maleic anhydride according to a reaction similar to (2). In fact, such a reaction occurs more easily with compounds different from maleic anhydride, such as vinyl or vinylidene compounds (e.g. acrylates or methacrylates). It is to be assumed that with 1,2-substituted ethylenic compounds (such as derivatives of maleic or crotonic acid, etc.) the propagation of polymeric chains is less probable and other radical type reactions, such as illustrated below, occur preferentially:

(c) The radicals formed according to (2) can form, together with radicals bound to other chains, cross-links by a mutual termination reaction of the type

(3)

(d) Or a termination of the radical chains by dismutation as illustrated below (4) can occur

(4)

or a termination of the growing radical chains by combination with a free radical:

(5)

or, finally, chain transfer to atoms or radicals originating from another polymeric chain (6)

(7)

Other reactions can occur simultaneously with those illustrated in (1) to (7) above, such as reactions between different radicals, and can, in some instances, also contribute to the vulcanization. In fact, by simple addition of initiators which supply free radicals, e.g., by mixing benzoyl peroxide with the polymer, a certain proportion of cross-links may be formed.

In Table I below, the most important properties of vulcanizates obtained in accordance with the invention, by mixing a linear, substantially amorphous ethylene-propylene copolymer with 1% benzoyl peroxide and varying amounts of maleic anhydride are set forth.

TABLE I

| Maleic anhydride percent of the polymer | Ultimate tensile strength, kg./cm² | Elongation at break, percent | Set at 200% elongation percent | Solubility in benzene at 35° C., percent | Swelling ratio at equilibrium [1] |
|---|---|---|---|---|---|
| 0 | 23 | 700 | 30 | 50 | 9 |
| 4 | 35 | 490 | 20 | 35 | 6 |
| 8 | 52 | 450 | 15 | 28 | 5 |

[1] See P. Flory: "Principles of polymer chemistry, p. 579.

From the data given in Table I, it is clear that the use of maleic anhydride results in good vulcanization of the copolymer. This result can be explained according to reactions (2) and (7).

The elastomers we obtain from mixtures containing zinc oxide in addition to maleic anhydride are even more effectively vulcanized than those we obtain in the absence of zinc oxide and this can be explained by assuming that zinc oxide forms salt bonds between the various chains, reacting with the anhydride groups which can be bound to the chains according to reactions (4), (5), (6) and (7).

Our results are obtained only with compounds containing at least one double bond capable of reacting through a radical-type reaction and free carboxylic (or anhydride) groups.

Table II below gives the mechanical characteristics of products prepared from an ethylene-propylene copolymer having a molecular weight of 165,000 and containing 47 mols percent propylene, using maleic acid, and contrasts those products with the products obtained with the aid of dimethyl maleate or succinic acid, instead of maleic acid.

TABLE II. FOR 100 PARTS BY WEIGHT OF COPOLYMER USED

| | | | |
|---|---|---|---|
| Benzoyl peroxide | 2 | 2 | 2 |
| Maleic acid | 9 | -- | -- |
| Dimethyl maleate | -- | 11 | -- |
| Succinic acid | -- | -- | 9 |
| Zinc oxide | 20 | 20 | 20 |

Vulcanization was carried out at 160° C. for 30 minutes.

| | Maleic Acid | Dimethyl Maleate | Succinic Acid |
|---|---|---|---|
| Ultimate tensile strength kg./cm².  | 125 | 47 | 45 |
| Elongation at break percent | 460 | 835 | 980 |
| Modulus at 100% kg./cm². | 25 | 8 | 7 |

When unsaturated compounds which are easily polymerized are used, such as, for instance, acrylic acid, chains containing a higher number of monomeric units may be grafted onto the copolymer and, therefore, in those cases a larger amount of monomer must be used in order to reach the same degree of vulcanization.

The most important characteristics of elastomers according to the invention and obtained from an ethylene-propylene copolymer having a molecular weight of about 340,000, by grafting various unsaturated compounds onto the copolymer and then vulcanizing the mass are given in Table III. For each 100 parts by weight of the copolymer, 2 parts of benzoyl peroxide and 20 parts of zinc oxide were used. The unsaturated compound was added to the mix in an amount such as to obtain 0.15 carboxyl group mol equivalents per 100 g. of the copolymer. The vulcanization was effected at 160° C. for 30 minutes.

TABLE III

| Unsaturated Compound Grafted | Ultimate tensile strength kg./cm² | Elongation at break, percent | Modulus at 300% kg./cm.² | Rebound at 18° C., percent | Hardness (International degrees) |
|---|---|---|---|---|---|
| Maleic acid | 150 | 550 | 57 | 73 | 56 |
| Fumaric acid | 92 | 620 | 47 | 71 | 49 |
| Citraconic anhydride | 92 | 460 | 56 | 73 | 55 |
| Acrylic acid | 94 | 445 | 67 | 73 | 51 |
| Itaconic acid | 105 | 500 | 67 | 71 | 53 |
| Crotonic acid | 85 | 455 | 68 | 72 | 52 |
| Cinnamic acid | 64 | 570 | 44 | 72 | 53 |

Table IV below shows the characteristics of products obtained from an ethylene-propylene copolymer having a molecular weight of about 340,000, using 2 parts benzoyl peroxide, 9 parts of maleic acid, and 0.25 mols of metal oxide or hydroxide per 100 parts of copolymer, and effecting the vulcanization at 160° C. for 30 minutes.

TABLE IV

| MeO | MgO | — | CaO | — | ZnO | CdO | PbO | FeO |
|---|---|---|---|---|---|---|---|---|
| Me(OH)$_2$ | — | Mg(OH)$_2$ | — | Ca(OH)$_2$ | — | — | — | — |
| Tensile strength kg./cm.$^2$ | 132 | 112 | 108 | 109 | 151 | 128 | 110 | 85 |
| Elongation at break, percent | 433 | 367 | 487 | 587 | 553 | 487 | 480 | 567 |
| Modulus at 300%, kg./cm.$^2$ | 70 | 94 | 62 | 51 | 57 | 70 | 60 | 45 |
| Rebound at 18° C., percent | 72 | 71 | 73 | — | 73 | 73 | — | 71 |
| Hardness (International) | 59 | 61 | — | — | 56 | 59 | — | 56 |

The elastomers can be prepared by mixing the polymers containing monomeric units derived from the alpha-olefins with the various mix ingredients in a roll mixer of the type commonly used in processing rubber, by introducing first the polymer into the mixer and rolling it until a homogeneous, flexible sheet is obtained and thereafter adding the radical initiator and the unsaturated compound to the sheet, the mixing being continued until a complete homogenization of those ingredients with the polymer is obtained.

Finally, if desired, the agent capable of forming salt bridges (e.g. ZnO) and, optionally, reinforcing fillers, dyes, etc. may be added. The vulcanization is then carried out in a press or autoclave at the appropriate temperature and for the appropriate time.

The polymer may be mixed with the radical initiator and with the compound to be grafted in other ways. For instance, a good homogenation of the ingredients can be obtained by mixing them in a solvent, particularly benzene, which dissolves the various components of the mixture. Thus, a benzene solution of an ethylene-propylene copolymer as obtained directly in the copolymerization of the monomers may be used, after removal of the catalyst decomposition products, benzoyl peroxide and maleic anhydride being added to the solution at temperatures not higher than 80° C., and preferably between 40° C. and 60° C.

The resulting homogeneous product may be separated from the solvent by evaporating the latter, preferably under vacuum.

Since the initial mix is a multi-components system, when the methods just described are used the possibility of grafting the unsaturated compound on the polymer chains may be reduced by the effect of other reactions which take place during the mixing and vulcanization, such as, for example, the formation of salts between the unsaturated compound containing functional acidic groups and the basic substance, reactions between the radical initiator and the unsaturated compounds, scission of the polymer resulting in degradation etc.

These reactions can considerably lower the yield of graft polymer referred to the unsaturated compound added to the mix, and can also lead to the formation of compounds which act as inert charges or diluents, thus lowering the values for the mechanical and elastic characteristics of the end product.

We have observed, also, that if, in those essentially single-stage methods, carbon black, antioxidants, peptizing agents and/or radical inhibitors are added to the initial mix, the mechanical and elastic properties of the elastomers obtained are definitely inferior to those of the elastomers obtained by the same methods from mixes in which those adjuvants are not incorporated. This is probably due to the fact that the adjuvants mentioned tend to block the free radicals present in the polymer chain, thus interfering with both the grafting of the unsaturated compound on the polymer chain and the formation of cross-links by coupling of two free radicals. The mentioned adjuvants favor scission reactions rather than cross-linking and thus can favor a degradation of the polymer.

In order to obtain elastomers having the best elastic and ageing properties it is preferred to employ a two-stage method. According to this preferred procedure, the unsaturated compound containing functional acid groups is first grafted on the alpha-olefin polymer or copolymer, and then the chains are cross-linked by means of polyfunctional basic substances such as polyvalent metal oxides, glycols, diamines, etc.

More specifically, the graft polymer (which in some cases ran also contain a high proportion of gel) is obtained by mixing the polymer or copolymer with the radical initiator and the unsaturated compound containing functional acid groups and heating the mixture to a high temperature, preferably in the absence of oxygen. The duration of the thermal treatment and the temperature to be reached depend mainly on the amount and can be so selected that, after the thermal treatment, the radical initiator is practically completely decomposed, the maximum possible number of grafted functional groups being thus obtained. The graft polymer is then suitably treated in a mix roller to plasticize and homogenize it, after which the basic agent is added. The mixture is finally vulcanized, yielding elasomers having very good elastic and ageing properties.

The mechanical properties of an ethylene-propylene copolymer after the first-stage treatment (grafting) with benzoyl peroxide and maleic acid and after the second-stage treatment (vulcanization) with ZnO, are compared in Table V.

TABLE V

|  | Graft Copolymer | Vulcanized Copolymer |
|---|---|---|
| Ultimate tensile strength, k.g/cm.$^2$ | 20 | 100 |
| Elongation at break, percent | 725 | 780 |
| Modulus at 100% elongation, kg./cm.$^2$ | 5 | 10 |

The amounts of radical initiator and of unsaturated compound containing functional acid groups required to produce good elastomers by the two-stage method are considerably smaller than when the one-stage method is used.

Table VI lists the most important characteristics of an elastomer obtained from an ethylene-propylene copolymer (69 mols percent propylene) by the one-step method, using 2.0 parts of dibenzoyl peroxide and 9.0 parts of maleic acid and 20 parts of zinc oxide per 100 parts of the copolymer, in comparison with the characteristics of an elastomer obtained from a similar copolymer by the two-step method, using 1.0 part of dibenzoyl peroxide, 3.0 parts of maleic acid, 1.5 parts antioxidant (2,2-methylene-bis-dimethyl-tert.-butylphenol) and 10 parts zinc oxide per 100 parts of the copolymer.

TABLE VI

|  | Direct Vulcanization | Vulcanization in Separate stages |
|---|---|---|
| Ultimate tensile strength, kg./cm.$^2$ | 137 | 100 |
| Elongation at break, percent | 840 | 780 |
| Modulus at 300% elongation, kg./cm.$^2$ | 24 | 25 |

As is apparent from Table VI, the addition of antioxidants to the graft polymer does not inhibit subsequent cross-linking of the chains by zinc oxide. Therefore, the elastomer can be protected effectively against the action of oxygen and its resistance to degradation by atmospheric agents can be increased by the use of antioxidants.

We have also observed that the elastic and mechanical properties of the elastomers can be improved by adding suitable amounts of saturated organic acids, such as, for instance, stearic acid, oxalic acid, phthalic acid, etc. to the graft polymer, prior to mixing zinc oxide therewith. Table VII gives the most important mechanical and elastic characteristics of at product obtained from an ethylene-propylene copolymer (60 mols percent propylene and previously grafted with 3.0 parts maleic acid in the presence of 1.0 part dibenzoylperoxide) by the two-stage method, using 10 parts of zinc oxide and various amounts of stearic acid, and vulcanizing the mass at 160° C. for 45 minutes.

TABLE VII

| Stearic acid parts per 100 parts of polymer | Ultimate tensile strength, kg./cm.² | Elongation at Break, percent | Modulus at 300% elongation kg./cm.² |
| --- | --- | --- | --- |
| ------ | 95 | 600 | 38 |
| 6 | 116 | 630 | 40 |
| 11 | 140 | 730 | 31 |

The two-stage method of preparing the mass for vulcanization has still further advantages. The first thermal treatment, in which the grafting is obtained, can be prolonged until the radical initiator is completely decomposed, so that the presence thereof in the finished elastomer is avoided, and thus the harmful effect normally exerted by the inhibitor on the ageing properties of the elastomer is also avoided. Moreover, when the two-stage process is used, the amounts of carbon black normally used for large-sized articles, e.g., tires, can be incorporated with the polymer or copolymer without damage to the mechanical and elastic properties of the elastomer.

In fact, in the two-step method the vulcanization is obtained mainly by formation of ionic cross-links rather than by formation of carbon-to-carbon cross-links due to coupling of radicals, and therefore carbon black and other reinforcing fillers can exert their reinforcing effect fully, without hindering the vulcanization.

The addition of the fillers improves the abrasion resistance of the elastomer, increases the elastic modulus and ultimate strength thereof, and in general improves the resistance of the elastomer to oxidation and degradation, by light and atmospheric agents. In particular, carbon black improves the mechanical properties of the elastomer at high temperature.

In the two-step method of preparing the mass for vulcanization as described herein, grafting of the unsaturated compound on the polymer chains can be obtained by mixing the polymer with the radical initiator and with the unsaturated compound in roll mixers as commonly used for rubber, and successive thermal treatment in an oven, press or Banbury mixer at high temperature, of 100° to 250° C. Such thermal treatment is preferably carried out in the absence of oxygen in order to avoid degrading the polymer.

Also, when the two-stage method of preparing the mass is used, grafting of the unsaturated compound on the polymer chains can be carried out in solution using, for example, the solution of the ethylene-propylene copolymer obtained directly in the polymerization, adding the radical initiator and the unsaturated compound to the solution, and heating the solution to high temperature until the graft polymer is obtained. The graft polymer can be recovered from the solvent by coagulation or by evaporation under reduced pressure, and then vulcanized as described herein.

The vulcanized rubbers of the invention have very good elastomeric properties and, moreover, the properties can be varied over wide limits by varying:

(1) the starting polymer and, in the case of copolymers, the composition thereof;

(2) the amount and type of unsaturated compound grafted on the polymer;

(3) the amount and type of radical initiator used;

(4) the amount (generally between 0 and 20%) of the agent, such as ZnO, capable of forming salt bridges which is used.

For example, when the elastomers are prepared from linear, substantially amorphous ethylene-propylene copolymers produced as disclosed by Natta et al., the ultimate tensile strength, elastic modulus, and impact resilience of the elastomers can be increased by increasing the ethylene content, conditions (2) and (3) listed above being equal.

Other factors being equal, the properties of the vulcanized products are also varied in the direction of increased ultimate tensile strength, elastic modulus and impact resilience, by increasing the amount of agent capable of forming salt bridges which is used. Thus, by mixing with an ethylene-propylene copolymer, per 100 parts thereof, 2.0 parts of benzoyl peroxide, 7.0 parts of maleic anhydride, and varying amounts of zinc oxide, and vulcanizing the respective mixes at 160° C. for 45 minutes, products having properties as shown in Table VIII are obtained.

TABLE III

| ZnO per 100 parts copolymer | 0 | 5 | 10 | 25 | 50 |
| --- | --- | --- | --- | --- | --- |
| Ultimate tensile strength kg./cm.² | 38 | 100 | 115 | 142 | 160 |
| Elongation at break, percent | 465 | 520 | 515 | 475 | 460 |
| Modulus at 100%, kg./cm.² | 11 | 13 | 14 | 16 | 18 |
| Rebound percent at: | | | | | |
| 20° C | 64 | -------- | 79 | -------- | 66 |
| 90° C | 70 | -------- | 81 | -------- | 80 |
| Hardness (international) | 49 | 53 | 55 | 56 | -------- |
| Swelling ratio | 4.5 | 3.1 | 3.0 | 2.9 | 2.7 |

When finely dispersed metal oxides are used as agents capable of forming salt bridges, the surface hardness and abrasion resistance of the elastomer are improved. If no metal oxide is included in the mix, the vulcanized products obtained are transparent. Such transparent products are valuable for various applications. Moreover, the presence of free acidic groups facilitates adhesion of the transparent elastomers to metal surfaces and those products are therefore particularly adapted to use for coating metal surfaces.

The elastomers of this invention are saturated or substantially saturated products which are resistant to oxidation and weathering.

Moreover, our elastomers obtained from ethylenepropylene copolymers containing from 35% to 70% by weight of ethylene in the polymer molecule have a stress-elongation curve similar to that of amorphous products capable of being crystallized by stretching. It is possible, therefore, by this invention, to obtain rubbers which, even when they have a low initial modulus, reach high strains at high stresses (see FIG. 3, curve II of the accompanying drawing). For instance, and as shown in Example 13 below, the invention provides rubbers having (at 100% elongation) a modulus lower than 0.2 kg./mm.², an elongation at break of about 500%, and an ultimate strength of 1.2 kg./mm.².

The following examples are given to illustrate specific embodiments of the invention, it being understood that these examples are not intended as limiting.

EXAMPLE 1

100 parts of an ethylene-propylene copolymer containing 58 mols percent propylene and having a molecular weight of approximately 190,000 are introduced into a two-roll mixer, and mixed at a temperature of 60° C. until a homogeneous foil is obtained. Thereafter, 2 parts of benzoyl peroxide are added in 15 minutes. Mixing is continued at a lower temperature, approximately 30° C., for another 15 minutes with the addition of 7 parts maleic anhydride and variable amounts of zinc oxide. The mixing is continued until the mass is homogeneous. The product obtained is vulcanized in a parallel-plate press at 160° C. for 45 minutes. From the vulcanized foil specimens, according to the ASTM specification D412/51T specimens for tensile and other physical and chemical tests are obtained. The rebound is determined with a Pirelli apparatus of the type of the Goodyear-Healy rebound pendulum. (Standard Method of Test for Impact Resilience and Penetration of Rubber by the Rebound Pendulum, ASTM D1054–55, adopted 1955.) The swelling ratio is measured using benzene as a solvent at 35° C. for 90 hours.

| ZnO parts per 100 p. copolymer | Ultimate tensile strength, kg./cm.$^2$ | Elongation at break, percent | Modulus at 100%, kg./cm.$^2$ | Set at 200% elongation, percent | Set at Break, percent | Rebound at 20%, percent | Rebound at 90° C., percent |
|---|---|---|---|---|---|---|---|
| 2.5 | 58 | 300 | 15 | 8 | 5 | 68 | 81 |
| 1 | 37 | 270 | 13 | | 5 | 69 | 80 |
| 0 | 23 | 215 | 12 | 5 | 0 | 62 | 77 |

| | ZnO (10 parts per 100 parts of polymer) | ZnO (50 parts per 100 parts of polymer) |
|---|---|---|
| Ultimate tensile strength kg./cm.$^2$ | 115 | 160 |
| Elongation at break, percent | 515 | 460 |
| Modulus at 100% kg./cm.$^2$ | 14 | 18 |
| Rebound at 20°, percent | 69 | 66 |
| Rebound at 90°, percent | 81 | 80 |
| Hardness (international degrees) | 55 | |
| Swelling ratio | 3 | 2.7 |

EXAMPLE 2

100 parts of an ethylene-propylene copolymer containing 70 mols percent propylene and having a molecular weight of approximately 130,000 are mixed, as in Example 1, for 20 minutes at 60° C. with 2 parts of benzoyl peroxide and 9 parts of maleic acid, and successively for 15 minutes at 30° with 20 parts of zinc oxide. After vulcanization in a press at 160° for 30 minutes, a vulcanized product is obtained having the following characteristics:

Ultimate tensile strength, kg./cm.$^2$ _______ 137
Elongation at break, percent _______ 845
Modulus at 100%, kg./cm.$^2$ _______ 9

Figure 1:
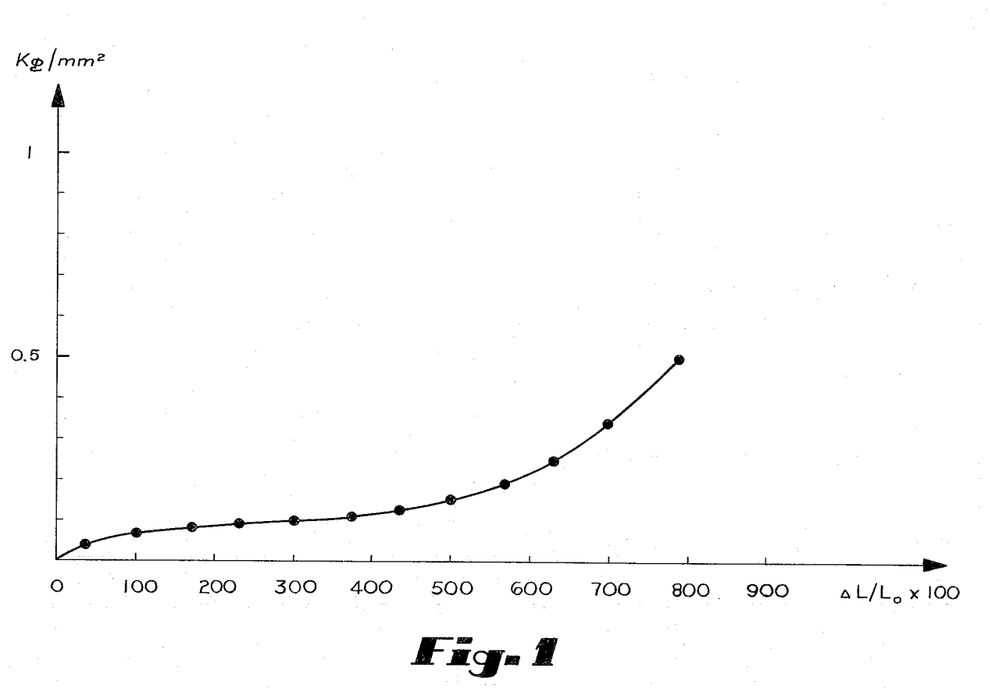
FIGURE 1 shows the stress elongation curve for one elastomer prepared from an ethylene-propylene copolymer in accordance with the invention.

The shape of the stress elongation curve is shown in FIGURE 1 of the accompanying drawing.

EXAMPLE 3

100 parts of an ethylene-propylene copolymer having a molecular weight of approximately 350,000 are mixed for 20 minutes at 60° C. with 3.2 parts of tertiary butyl perbenzoate and 9 parts maleic acid. Successively, 20 parts zinc oxide are added in 15 minutes at 30° C. After vulcanization in a press at 130° for 30 minutes, a product having the following characteristics is obtained:

Ultimate tensile strength, kg./cm.$^2$ _______ 69
Elongation at break, percent _______ 460
Modulus at 100%, kg./cm.$^2$ _______ 19
Swelling ratio in $CCl_4$ at 50° C. _______ 5.3

EXAMPLE 4

100 parts of the ethylene-propylene copolymer of Example 1 are treated in a roll mixer with 3 parts chlorobenzoyl peroxide ("Lucidol") and 5 parts maleic anhydride at 60° C. After curing in press at 160° C. for 20 minutes, a product having the following properties is obtained:

Ultimate tensile strength, kg./cm.$^2$ _______ 40
Elongation at break, percent _______ 670
Modulus at 100%, kg./cm.$^2$ _______ 9
Modulus at 200%, kg./cm.$^2$ _______ 13
Set at break, percent _______ 25–30
Set at 200% elongation, percent _______ 10

EXAMPLE 5

A benzene solution of the ethylene-propylene copolymer of Example 1, having a concentration of 50 g./l. is prepared. To this solution, kept at 50° C. under nitrogen, 10 parts benzoyl peroxide and 8.3 parts maleic anhydride (on 100 parts copolymer) are added, while stirring. This solution is stirred for 6 hours and the solvent is then completely removed by evaporation under vacuum at 50° C. The product thus obtained is mixed and homogenized in a roll mixer with zinc oxide at 30° C. and then cured in a press at 160° C. for 45 minutes. By varying the amounts of zinc oxide used, the results set forth in the table above were obtained.

The fact that the addition of zinc oxide causes an increase, instead of a lowering, of the rebound, shows that zinc oxide takes part actively in the vulcanization, forming cross-links between the chains.

EXAMPLE 6

To a benzene solution of the ethylene-propylene copolymer of Example 1, 10 parts benzoyl peroxide and 20 parts maleic acid are added per 100 parts copolymer. The solution is stirred at 60° C. for about 6 hours and the solvent is then removed by evaporation under vacuum. This mixture is completely homogenized in a roll mixer and then cured at 160° C. for 20 minutes. A product having the following properties is thus obtained:

Ultimate tensile strength, kg./cm.$^2$ _______ 39
Elongation at break, percent _______ 230
Modulus at 100%, kg./cm.$^2$ _______ 17
Set at break, percent _______ 5

EXAMPLE 7

To a 40 g./l. benzene solution of an ethylene-proylene-isoprene copolymer, having an iodine number of 23, kept at 50° C., 8.3 parts maleic anhydride and 10 parts benzoyl peroxide per 100 parts (by weight) of polymer are added. After 10 hours, stiring is stopped and the solvent is evaporated under reduced pressure at about 40° C. The polymer thus treated is mixed for a few minutes at 30° C. with 2.5% by weight ZnO in a laboratory roll mixer.

This mix is successively cured in a press at 160° C. for 45 minutes under a pressure of about 50 kg./cm.$^2$. From the tensile tests the following results have been obtained:

Ultimate tensile strength, kg./cm.$^2$ _______ 58
Elongation at break, percent _______ 375
Modulus at 100%, kg./cm.$^2$ _______ 13
Modulus at 200%, kg./cm.$^2$ _______ 27
Set at break, percent _______ 10
Set at 200%, percent _______ 10

EXAMPLE 8

To a 50 g./l. benzene solution of an ethylene-propylene-isoprene copolymer having an iodine number of 7, kept at 50° C., 8.3 parts maleic anhydride and 10 parts benzoyl peroxide per 100 parts by weight of polymer are added. After 10 hours, the solvent is evaporated under reduced pressure at about 40° C. A portion of the carefully dried product is homogenized for 3 minutes in a laboratory roll mixer at 30° C. After curing in a press at 160° C. for 45 minutes, a vulcanized product having the following tensile characteristics is obtained:

Ultimate tensile strength, kg./cm.$^2$ _____________ 28
Elongation at break, percent ___________________ 360
Modulus at 100%, kg./cm.$^2$ __________________ 9
Modulus at 200%, kg./cm.$^2$ __________________ 15
Set at break, percent _________________________ 8
Set at 200%, percent _________________________ 5
Rebound at 21° C., percent ___________________ 51
Rebound at 90° C., percent ___________________ 64

The residual portion of the product is mixed at 30° C. for 5 minutes with 2.5% (by weight) ZnO in a roll mixer and then cured in a press at 160° C. for 45 minutes. The vulcanized product shows the following mechanical characteristics:

Ultimate tensile strength, kg./cm.$^2$ _____________ 48
Elongation at break, percent ___________________ 400
Modulus at 100%, kg./cm.$^2$ __________________ 11
Modulus at 200%, kg./cm.$^2$ __________________ 19
Set at break, percent _________________________ 10
Set at 200%, percent _________________________ 10
Rebound at 21° C., percent ___________________ 53
Rebound at 90° C., percent ___________________ 63

EXAMPLE 9

To a 60 g./l. benzene solution of an ethylene-propylene-isoprene copolymer having an iodine number of 5, kept at 50° C., 8.3 parts maleic anhydride and 10 parts benzoyl peroxide, per 100 parts polymer, are added. After 10 hours the solvent is evaporated under vacuum at 40° C. A portion of the product is mixed with 2% (by weight) ZnO and cured at 160° C. for 20 minutes. The vulcanized product shows the following mechanical characteristics:

Ultimate tensile strength, kg./cm.$^2$ _____________ 34
Elongation at break, percent ___________________ 153
Set at break, percent _________________________ 2
Rebound at 21° C., percent ___________________ 56
Rebound at 90° C., percent ___________________ 75

The residual portion of the product, after a simple homogenization in the roll mixer, is cured in a press at 160° C. for 20 minutes. The vulcanized product shows the following mechanical characteristics:

Ultimate tensile strength, kg./cm.$^2$ _____________ 41
Elongation at break, percent ___________________ 265
Set at break, percent _________________________ 7
Rebound at 21° C., percent ___________________ 58
Rebound at 90° C., percent ___________________ 72

EXAMPLE 10

To a 30 g./l. benzene solution of an ethylene-propylene-acetylene copolymer, containing about 0.5% acetylene, kept at 50° C., 8.3 parts maleic anhydride and 10 parts benzoyl peroxide per 100 parts polymer (by weight) are added. After 20 hours, the solvent is evaporated under reduced pressure at 40° C. The product, mixed with 2.5% ZnO, is cured in a press at 160° C. for 20 minutes. The vulcanized product shows the following characteristics:

Ultimate tensile strength, kg./cm.$^2$ _____________ 48
Elongation at break, percent ___________________ 313
Set at break, percent _________________________ 40

EXAMPLE 11

100 parts of an ethylene-propylene copolymer having a molecular weight of approximately 340,000 are mixed as in Examples 2 and 3, with 2 parts benzoyl peroxide, 10 parts acrylic acid and 20 parts zinc oxide. The mix is vulcanized in a press at 160° C. for 30 minutes, yielding a product having the following characteristics:

Ultimate tensile strength, kg./cm.$^2$ _____________ 94
Elongation at break, percent ___________________ 447
Modulus at 100%, kg./cm.$^2$ __________________ 26
Rebound at 18° C., percent ___________________ 73
Hardness (International Degrees) _____________ 51

EXAMPLE 12

100 parts of the ethylene-propylene copolymer of Example 1 are treated for about 10 minutes in a roll mixer at 60° C. with 3 parts benzoyl peroxide. 20 parts of a mixture of the same copolymer with maleic anhydride, containing 42% maleic anhydride, and 10 parts zinc oxide are then added and mixing is continued until a homogeneous sheet is obtained. After curing in a press at 160° C., rubbers having the following properties are obtained:

| Curing time, minutes | Ultimate Tensile, kg./cm.$^2$ | Elongation at break, percent | Modulus at 100%, kg./cm.$^2$ | Set at 200% elongation, percent |
|---|---|---|---|---|
| 30 | 66 | 450 | 12 | 10 |
| 45 | 102 | 490 | 13 | 10 |

Figure 2:
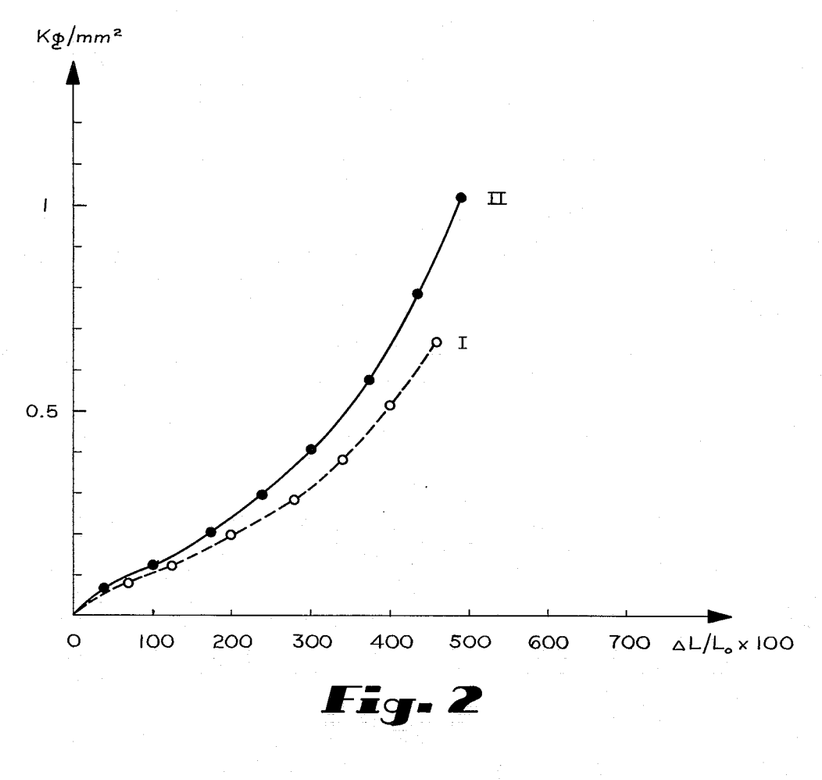
FIGURE 2 shows the stress elongation curves I and II for an elastomer prepared from an ethylene-propylene copolymer using different vulcanization times.

The stress-elongation curves are shown in FIGURE 2 of the drawing (Curve I curing time 30 minutes, Curve II curing time 45 minutes).

EXAMPLE 13

100 parts of the ethylene-propylene copolymer of Example 1 are treated in a roll mixer at 60° C. with 3 parts benzoyl peroxide and successively with 8 parts maleic acid and with zinc oxide. The product obtained is cured in a press at 160° C. for 45 minutes. Rubbers having the following properties are obtained:

| ZnO p./per 100 p. polymer | Ultimate Tensile strength, kg./cm.$^2$ | Elongation at break, percent | Modus at at 100%, kg./cm.$^2$ | Set at 200%, percent |
|---|---|---|---|---|
| 5 | 82 | 600 | 10 | 10 |
| 10 | 120 | 520 | 13 | 10 |

Figure 3:
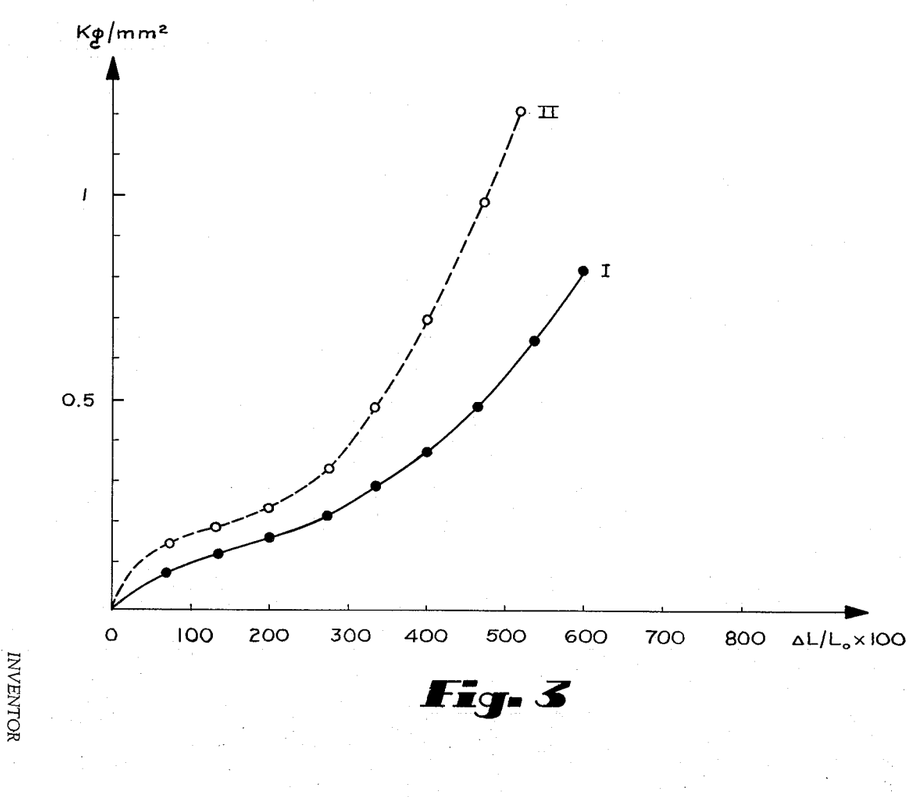
FIGURE 3 shows the stress-elongation curves I and II for an elastomer prepared from an ethylene-propylene copolymer using different amounts of zinc oxide in the vulcanization.

The stress-elongation curves are shown in FIGURE 3 of the drawing (Curve I, 5 p. ZnO; Curve II, 10 p. ZnO).

EXAMPLE 14

100 parts of the ethylene-propylene copolymer as used in Example 11 are mixed as in that example with 2 parts benzoyl peroxide, 9 parts maleic acid and 10 parts magnesium oxide. The mix is vulcanized at 160° C. for 30 minutes, yielding a product having the following characteristics:

Ultimate tensile strength, kg./cm.$^2$ _____________ 132
Elongation at break, percent ___________________ 433
Modulus at 100%, kg./cm.$^2$ __________________ 24
Rebound at 18° C., percent ___________________ 72
Hardness (International Degrees) _____________ 59

EXAMPLE 15

100 parts of an ethylene-propylene copolymer containing 70 mols percent propylene and having a molecular weight of about 130,000 are introduced into a two roll-mixer, kept at 60° C., together with 2 parts benzoyl peroxide, and mixed for 10 minutes. Nine parts maleic acid are then added and mixing is continued for about 10 minutes. The mixture thus obtained is heated in a parallel plate press at 160° C. for 30 minutes, under a pressure of 50 kg./cm.$^2$.

Half of the product thus obtained is further treated at room temperature for 5 minutes in a two rolls-mixer until a plastic and homogeneous sheet is obtained, to which, in 5 minutes, 1.5% by weight antioxidant (2,2-methylene-bis(4-methyl-6-tert.-butylphenol) and 10% by weight zinc oxide are added. This mixture is vulcanized in a press at 160° C. for 30 minutes, under a pressure of 70 kg./cm.$^2$.

The remaining portion of product obtained after the first treatment in a press is mixed at room temperature for 15 minutes in a two rolls-mixer, with 1.5% (by weight) antioxidant, 10% by weight of MPC carbon black, and 10 parts by weight of zinc oxide. It is vulcanized in a press for 30 minutes at 160° C. under a pressure of 70 kg./cm.$^2$. From the two vulcanized foils, specimens for tensile tests are obtained, using hollow punches according to ASTM D412–51T. The tests are carried out with a rate of separation of the grips of 50 mm./minute and at 18° C.

| MPC carbon black parts by weight | Ultimate tensile strength, kg./cm.$^2$ | Elongation at Break, percent | Modulus at 300%, kg./cm.$^2$ |
| --- | --- | --- | --- |
| 0 | 83 | 590 | 38 |
| 10 | 114 | 607 | 48 |

EXAMPLE 16

100 parts by weight of the ethylene-propylene copolymer of Example 15 are mixed for 20 minutes at 60° C. with 1 part by weight benzoyl peroxide and 3 parts maleic acid. The mixture is heated in a press for 30 minutes at 160° C. under a pressure of 50 kg./cm.$^2$, and the product thus obtained is introduced again into the mixer at room temperature and then added with 1.5 parts by weight antioxidant and 10 parts by weight zinc oxide.

The mixture is then vulcanized in a press at 160° C. for 45 minutes under a pressure of 70 kg./cm.$^2$.

Subjected to tensile tests at a temperature of 18° C., the elastomer shows the following characteristics:

Ultimate tensile strength, kg./cm.$^2$ _______________ 100
Elongation at break, percent _______________ 780
Modulus at 300%, kg./cm.$^2$ _______________ 25

EXAMPLE 17

100 parts by weight of an ethylene-propylene copolymer containing 60% propylene and having a molecular weight of about 150,000, are mixed for 20 minutes at 60° C. with 1 part benzoyl peroxide and 3 parts maleic acid.

The product is then treated in a press at 160° C. for 30 minutes under a pressure of 50 kg./cm.$^2$.

The product thus obtained is further treated in a mixer, the rolls of which are kept at about 60° C., with 1.5 parts antioxidant, 6 parts stearic acid, 10 parts zinc oxide and variable amounts of MPC carbon black.

Mixing is continued for about 20 minutes until the mixture is homogeneous. The vulcanization is carried out at 160° C. for 45 minutes under a pressure of 70 kg./cm.$^2$. Varying the amount of carbon black, the properties of the vulcanized product vary as follows:

RESULT OF TENSILE TESTS

| Carbon black, percent by weight | Test rate 50 mm./minute—Test temperature 18° C. | | |
| --- | --- | --- | --- |
| | Ultimate tensile strength, kg./cm.$^2$ | Elongation at break, percent | Modulus at 300%, kg./cm.$^2$ |
| 0 | 116 | 630 | 40 |
| 20 | 142 | 587 | 57 |
| 40 | 170 | 575 | 81 |

EXAMPLE 18

100 parts of an ethylene-propylene copolymer containing 45 mols percent propylene and a molecular weight of about 200,000, are mixed for 20 minutes at 60° C. with 1 part by weight benzoyl peroxide and 3 parts by weight maleic acid, and heated in a press at 160° C. for 30 minutes under a pressure of 50 kg./cm.$^2$.

The product thus obtained is further treated for 45 minutes in a mixer, the rolls of which are kept at 60° C., with 1.5 parts by weight antioxidant, 11.5 parts by weight stearic acid, and 10 parts zinc oxide. The vulcanization is carried out at 160° C. for 45 minutes, under a pressure of 70 kg./cm.$^2$.

The tensile tests give the following results:

Ultimate tensile strength, kg./cm.$^2$ _______________ 110
Elongation at break, percent _______________ 490
Modulus at 300%, kg./cm.$^2$ _______________ 50

EXAMPLE 19

100 parts of an ethylene-propylene copolymer having a molecular weight of 344,000 mixed for 20 minutes at a temperature of 60° C. with 3 parts maleic acid; the temperature is brought to 20° C., 0.6 parts tertiary butyl peroxide are added and mixing is continued for 5 minutes. The mix is then heated in a press at 200° C. and 70 kg./cm.$^2$ for 30 minutes.

The product obtained is mixed for 50 minutes at 60° C. with 0.5 part antioxidant, 6 parts stearic acid, 45 parts MPC carbon black and 5 parts zinc oxide.

Curing is carried out at 160° C. for 45 minutes.

The cured product is tested at room temperature, with the following results:

Ultimate tensile strength, kg./cm.$^2$ _______________ 281
Elongation at break, percent _______________ 480
Modulus at 100% elongation, kg./cm.$^2$ _______________ 31.4
Modulus at 300% elongation, kg./cm.$^2$ _______________ 138
Hardness (International Degrees) _______________ 76.5
Rebound, percent _______________ 61

Although we have exemplified the invention in terms of the copolymers, the high molecular weight homopolymers of the alpha-olefins which have substantially the Natta atactic structure and are, therefore, amorphous and non-crystallizable under any conditions can also be used as starting material for the production of elastomers according to this invention. Such atactic polymers are linear, regular head-to-tail polymers of the monomers $CH_2=CHR$ where R is a lower alkyl radical and in which the R group and hydrogen atom attached to the tertiary asymmetric carbon atoms of adjacent monomer units are randomly distributed on both sides of the main chain.

Amounts of the principal reagents and vulcanization agents to be used in the process of this invention may be summarized as follows (parts by weight per 100 parts olefinic polymer or copolymer):

Unsaturated organic compound containing
    functional acid groups _______________ 2 to 20.
Radical initiator _______________ 0.2 to 10.
Compound capable of forming salt bridges __ 0 to 50.

The term "polymer" as used herein includes the linear, substantially amorphous (atactic) homopolymers of the alpha-olefins, the copolymers of the alpha-olefins with each other, copolymers of the alpha-olefins with ethylene which may contain from 25% to 80% by weight of ethylene in the copolymer molecule, as well as copolymers (terpolymers) of the alpha-olefins, ethylene, and conjugated diolefins containing at least one vinyl type double bond, or acetylene, which contain, by weight in the polymer molecule, from 25% to 80% of ethylene, the balance (75% to 20%) being made up of the alpha-olefin and the conjugated diolefin or acetylene. In general, the conjugated diolefin such as butadiene or isoprene, or the acetylene, is present in the molecule in an amount of 0.5 to 20% by weight.

Some changes may be made in details in practicing the invention without departing from the spirit thereof and, therefore, it is intended to include in the scope of the appended claims all such modifications and variations as may be apparent to those skilled in the art.

What is claimed is:

1. An elastomer consisting essentially of (1) a linear, amorphous, saturated copolymer of ethylene and a higher alpha-olefin selected from the group consisting of propylene and butene-1, the chains of the copolymer, being cross-linked with from 2 to 20 parts by weight per 100 parts by weight, of the copolymer, of a compound containing, in the molecule thereof, at least one carbon-to-carbon double bond and at least one functional acid group, selected from the group consisting of mono- and di-carboxylic unsaturated aliphatic acids and anhydrides.

2. An elastomer according to claim 1, characterized in that (1) is a linear, amorphous, saturated copolymer of ethylene and propylene containing from 25% to 80% by weight of ethylene in the copolymer molecule.

3. An elastomer according to claim 1, characterized in that (1) is a linear, amorphous, saturated copolymer of ethylene and butene-1 containing from 25% to 80% by weight of ethylene in the copolymer molecule.

4. An elastomer according to claim 1, characterized in that (1) is a linear, amorphous, saturated copolymer of ethylene and propylene containing from 35% to 70% by weight of ethylene in the copolymer molecule, said elastomer being further characterized in having a rebound higher than 50% determined at 25° C. with a Goodyear-Healey Rebound Pendulum, a low initial modulus, and an ultimate tensile strength higher than 80 kg./cm.$^2$, and in being crystallizable when stretched.

5. An elastomer according to claim 1, further characterized in also containing, in an amount up to 50 parts by weight per 100 parts of the amorphous saturated copolymer, (3) and acid neutralizing substance selected from the group consisting of organic diamines, glycols, and oxides and hydroxides of metals selected from the group consisting of the alkali earth metals, magnesium, cadmium, zinc, lead and iron.

6. An elastomers according to claim 5, further characterized in that (3) is a metal oxide.

7. An elastomer according to claim 1, characterized in that (2) is maleic acid.

8. An elastomer according to claim 1, characterized in that (2) is maleic anhydride.

9. An elastomer according to claim 1, characterized in that (2) is acrylic acid.

10. An elastomer according to claim 4, characterized in that (2) is maleic acid.

11. An elastomer according to claim 4, characterized in that (2) is maleic anhydride.

12. An elastomer according to claim 4, characterized in that (2) is acrylic acid.

13. A process for preparing elastomers which comprises intimately mixing together (1) a linear, amorphous, saturated copolymer of ethylene and a higher alpha-olefin selected from the group consisting of propylene and butene-1 and, per 100 parts by weight of the copolymer, (2) from 0.2 to 10 parts of a radical initiator selected from the group consisting of organic peroxides, hydroperoxides and azo-compounds, (3) from 2 to 20 parts of a compound containing in the molecule at least one-carbon-to-carbon double bond and at least one acidic group selected from the group consisting of mono- and di-carboxylic unsaturated aliphatic acids and anhydrides which react with the copolymer in the presence of (2), and (4) up to 50 parts of an acid-neutralizing substance selected from the group consisting of organic diamines, glycols, and the oxides and hydroxides of metals selected from the group consisting of the alkali earth metals, magnesium, cadmium, zinc, lead and iron, at a temperature between 30° C. and 70° C., and then heating the mass thus obtained under pressure at a temperature higher than the mixing temperature to heat-cure the same.

14. The process according to claim 13, characterized in that (1) is a linear, amorphous, saturated copolymer of ethylene and propylene containing from 25% to 80% by weight of ethylene in the copolymer molecule.

15. The process according to claim 13, characterized in that (1) is a linear, amorphous, saturated copolymer of ethylene and butene-1 containing from 25% to 80% by weight of ethylene in the copolymer molecule.

16. The process according to claim 13, characterized in that (3) is maleic acid.

17. The process according to claim 13, characterized in that (3) is maleic anhydride.

18. The process according to claim 13, characterized in that (3) is acrylic acid.

19. The process according to claim 13, characterized in that (4) is a metal oxide.

20. The process according to claim 13, characterized in that (4) is zinc oxide.

21. The process according to claim 13, characterized in that (1) is a linear, amorphous, saturated copolymer of ethylene and propylene containing from 35% to 70% of ethylene by weight in the copolymer molecule; (2) is benzoyl peroxide; (3) is maleic acid; and (4) is zinc oxide.

22. An elastomer according to claim 1, characterized in consisting essentially of (1) a linear, amorphous, saturated copolymer of ethylene and propylene containing from about 35% to about 70% by weight of ethylene in the copolymer molecule; (2) maleic acid as a cross-linking agent between the chains of the copolymer; and (3) zinc oxide as an acid-neutralizer.

References Cited by the Examiner

UNITED STATES PATENTS

| | | | |
|---|---|---|---|
| 2,634,256 | 4/1953 | Sparks et al. | 260—78.4 |
| 2,662,874 | 12/1953 | Brown | 260—94.7 |
| 2,724,707 | 11/1955 | Brown | 260—82.1 |
| 2,837,496 | 6/1958 | Vandenberg | 260—877 |
| 2,882,263 | 4/1959 | Natta et al. | 260—877 |

FOREIGN PATENTS

| | | |
|---|---|---|
| 499,577 | 7/1949 | Canada. |
| 760,104 | 10/1956 | Great Britain. |

MURRAY TILLMAN, *Primary Examiner.*

D. ARNOLD, LEON J. BERCOVITZ, WILLIAM H. SHORT, *Examiners.*